(12) United States Patent
Sano et al.

(10) Patent No.: US 8,079,506 B2
(45) Date of Patent: Dec. 20, 2011

(54) STUD WELDING APPARATUS

(75) Inventors: Kazushige Sano, Toyohashi (JP);
Daisuke Miura, Toyohashi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 13/139,585

(22) PCT Filed: Dec. 15, 2009

(86) PCT No.: PCT/US2009/068015
§ 371 (c)(1),
(2), (4) Date: Jul. 12, 2011

(87) PCT Pub. No.: WO2010/075063
PCT Pub. Date: Jul. 1, 2010

(65) Prior Publication Data
US 2011/0259940 A1 Oct. 27, 2011

(30) Foreign Application Priority Data
Dec. 15, 2008 (JP) .................................. 2008-318369

(51) Int. Cl.
*B23K 37/00* (2006.01)
*B23K 9/00* (2006.01)
(52) U.S. Cl. ............................. 228/47.1; 219/98; 219/99
(58) Field of Classification Search ............... 219/99, 219/98; 228/110.1–114.5, 1.1–2.3, 47.1; 156/73.1–73.6, 64, 580, 358, 580.1, 580.2
See application file for complete search history.

(56) References Cited

U.S. PATENT DOCUMENTS

| 3,312,810 | A | * | 4/1967 | Neumeier | 219/98 |
| 3,327,089 | A | * | 6/1967 | Napoli | 219/98 |
| 3,418,441 | A | * | 12/1968 | Wieland et al. | 219/98 |
| 3,489,878 | A | * | 1/1970 | Wieland | 219/98 |
| 4,438,314 | A | * | 3/1984 | Giannone | 219/98 |
| 5,688,414 | A | * | 11/1997 | Kondo | 219/98 |
| 6,015,962 | A | * | 1/2000 | Wiessler et al. | 219/98 |
| 6,239,401 | B1 | * | 5/2001 | McCardle et al. | 219/98 |
| 6,270,002 | B1 | * | 8/2001 | Hayashi et al. | 228/246 |
| 6,392,186 | B1 | * | 5/2002 | McCardle | 219/98 |
| 6,476,339 | B2 | * | 11/2002 | Easterday | 219/99 |
| 6,940,035 | B2 | * | 9/2005 | Goebel | 219/98 |
| 7,521,646 | B2 | * | 4/2009 | Schlafhauser et al. | 219/98 |

FOREIGN PATENT DOCUMENTS

| JP | 08-071767 A | 3/1996 |
| JP | 11-291052 A | 10/1999 |
| JP | 2000-190077 A | 7/2000 |
| JP | 2008-093734 A | 4/2008 |

* cited by examiner

*Primary Examiner* — Kiley Stoner
*Assistant Examiner* — Carlos Gamino
(74) *Attorney, Agent, or Firm* — Harness, Dickey & Pierce, P.L.C.

(57) ABSTRACT

A stud welding apparatus comprises a feeder to receive a plurality of studs and feed the stud one by one with the stud being fed in advance of a weld portion thereof from an outlet of the feeder; and a welding gun to receive the stud as fed from the feeder through a feeding pipe to hold the stud and to weld the stud to a workpiece. The outlet of the feeder is provided with a shuttle loader wherein a hollow shuttle is loaded to a rod body of the stud to extend the length of a short stud, so that the shuttle loaded stud is lengthened as a whole to prevent the shuttle loaded stud from tumbling in the feeding pipe and/or a stud path in the welding gun.

10 Claims, 4 Drawing Sheets

(A)

(B)

(A)

(B)

STUD WELDING APPARATUS

FIELD OF THE INVENTION

The present invention relates to a stud welding apparatus for welding rod-shaped studs having a welding part to a workpiece in one end and more particularly to a stud welding apparatus comprising a feeder for accommodating a plurality of rod-shaped studs and feeding one stud at a time, with the welding part head first from an outlet thereof, and a welding gun to which is connected a feeder pipe extending from the outlet of the feeder to receive a stud fed from the feeder, holding that stud at its tip with the welding part and welding the welding part to a workpiece.

BACKGROUND OF THE INVENTION

In Japanese Application No. H7-171683, one example of a stud welding apparatus is described comprising a feeder for accommodating a plurality of rod-shaped studs having a welding part at one end and feeding one stud at a time, with the welding part head first, from an outlet thereof and a welding gun to which is connected a feeder pipe extending from the outlet of the feeder to receive a stud fed from the feeder, holding that stud at its tip with the welding part head first, and welding the welding part to a workpiece. This stud welding apparatus is provided with two escapes in the feeder, that is, with a stud queuing device so that stud feeding is speeded up.

In the stud welding apparatus cited in Japanese Application No. H7-171683 and in other conventional stud welding apparatuses, when feeding studs, it is necessary that the studs be at least of a predetermined length so they will not tumble in the feeder pipe or in the stud path of the welding gun. When the studs are short and tumble in the feeder pipe or welding gun stud path, the operation of sending studs in a suitable posture is hindered, and there is a danger of jamming inside the feeder pipe or welding gun stud path.

Therefore, an object of the present invention is to provide a stud welding apparatus by which, even when the studs are short enough to tumble inside the feeder pipe or welding gun stud path, studs can be sent in a suitable posture, and the danger of jamming inside the feeder pipe or welding gun stud path is eliminated.

SUMMARY OF THE INVENTION

In order to achieve the object stated above, based on the present invention, a stud welding apparatus is provided that comprises a feeder for accommodating a plurality of rod-shaped studs having a welding part at one end and feeding one stud at a time, with the welding part head first from an outlet thereof, and a welding gun to which is connected a feeder pipe extending from the outlet of the feeder to receive a stud fed from the feeder, holding that stud at its tip with the welding part head first and welding the welding part to a workpiece; wherein a shuttle mounting device is provided at the outlet portion of the feeder for mounting a hollow shuttle to the rod-shaped shank of the stud, which hollow shuttle receives the rod-shaped shank of the stud so as lengthen it; the overall length of the stud to which the shuttle has been mounted is then rendered a prescribed length so the stud will not tumble in the feeder pipe or in a stud path in the welding gun.

As described above, even when the studs are short enough to tumble inside the feeder pipe or in the welding gun stud path, the shuttle lengthens the studs overall so that they will not tumble in the feeder pipe or welding gun stud path. Studs can therefore be sent in a suitable posture in the feeder pipe and welding gun stud path, and the danger of jamming inside the feeder pipe or welding gun stud path can be eliminated. Furthermore, even if the studs are of various lengths and different shapes, when mounted in the shuttle, they can be made to have the same outer diameter and the same length, which facilitates making welding apparatuses more universal making it possible to handle studs of various lengths and different sizes with the same welding apparatus. In addition, it is also possible to provide a plurality of mounting devices so that even if the studs are of a different shapes for each mounting device, if they are mounted in a shuttle having the same outer diameter and length, the same welding gun can be used to select studs of different shape, either sequentially or randomly, and weld therewith.

In the stud welding apparatus described above, the welding gun welds a stud to the workpiece while holding the shuttle and then after welding that stud, moves away from the workpiece while holding the shuttle so that it separates from that welded stud, and the shuttle held by the welding gun is thereafter returned to the stud welding apparatus through a return pipe provided between the welding gun and the stud welding apparatus. In this way, the shuttle can be removed from the welding stud, and these used shuttles can be used again. The shuttle comprises a hollow rod-shaped body for receiving and holding the stud and is lengthened so that the stud will not tumble in the feeder pipe or the stud path in the welding gun. For that reason, even if the studs are so short as to be undesirable for feeding, they can be sent in a suitable posture to the welding gun. This shuttle has an entrance part contacted flush by the large-diameter welding part of a received stud and a terminating part closing off a hollow part for receiving the other end of such received stud. Also, a threaded member is provided in its terminating part and is of such length as can abut the other end of the received stud; the extension length from the terminating part can then be changed to match the length of the received stud. In this way, a stud received in a shuttle can be held without wobbling. In this case, the shuttle has a plurality of slits formed in the circumferential direction, extending in the longitudinal direction from the entrance part toward the terminating part, and the inner diameter of the stud-receiving hollow part of the shuttle is formed to be either equal to or slightly smaller than the outer diameter of the stud. By these slits, the portion of the shuttle from the entrance part to the terminating part is formed of a plurality of elastic pieces that extend in the longitudinal direction, and the rod-shaped shank of a stud received in the hollow part, due to these elastic pieces, can then be easily inserted, and the received stud will be held without wobbling. A stud queuing device is provided in the feeder, and the shuttle mounting device is provided between the stud queuing device and the outlet. In this way, when shuttles are mounted on the studs, the studs will be queued so mounting is easy and the used shuttles can easily be reused.

DETAILED DESCRIPTION OF THE PREFERRED EMBODIMENTS

Figure 1:
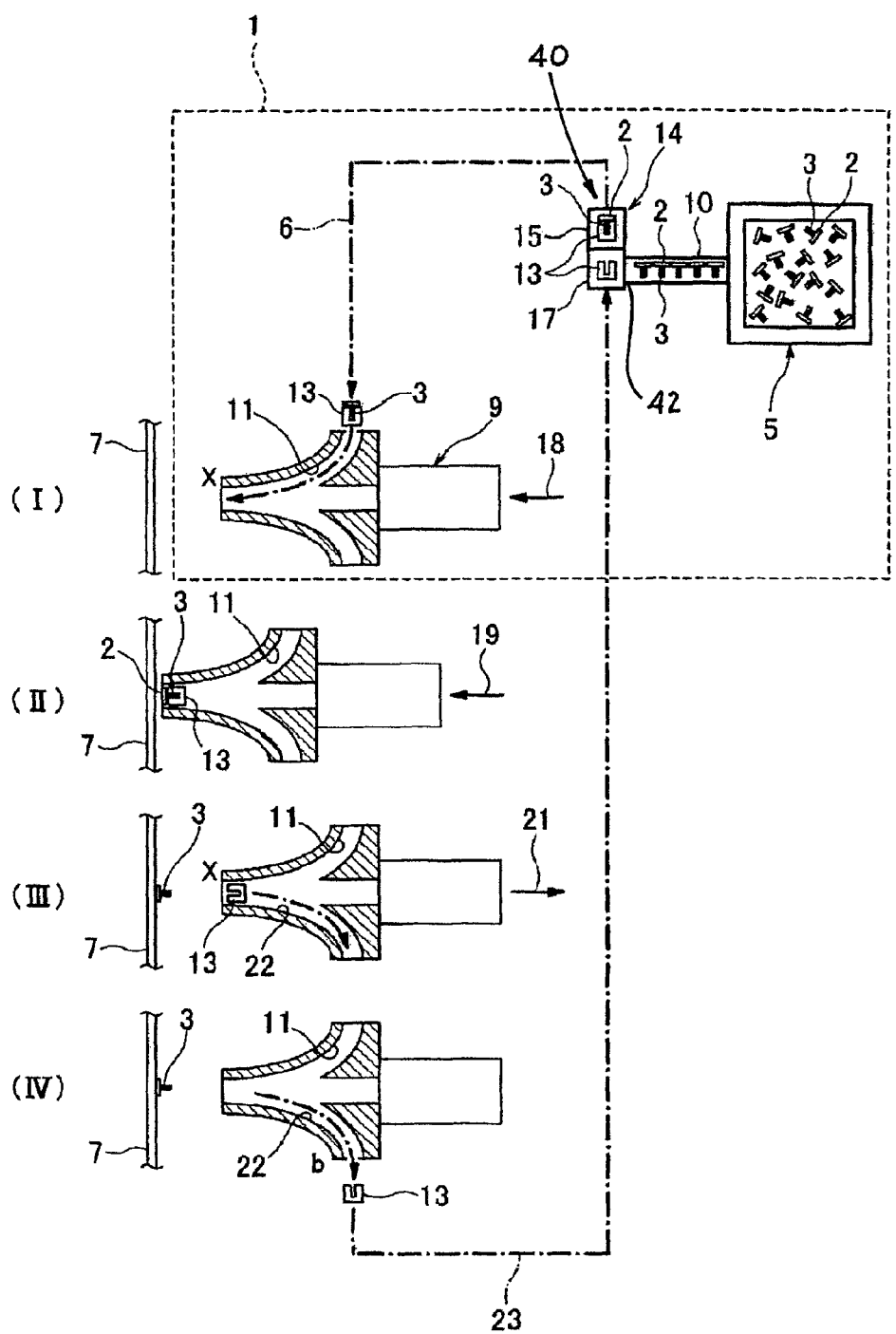
FIG. 1 is a diagram of a stud welding apparatus relating to one embodiment of the present invention, and also shows an initial stage I of the welding gun operation, a welding stage II, a pulling-up stage III and a shuttle return stage IV.

A stud welding apparatus 1 relating to one embodiment of the present invention shall now be described with reference to the drawings. FIG. 1 shows the stud welding apparatus 1, comprising a feeder 5 for accommodating a plurality of rod-shaped studs 3 having a welding part 2 at one end and feeding one stud 3 at a time, with the welding part 2 head first from an outlet portion 40 thereof, and a welding gun 9 to which is connected a feeder pipe 6 extending from the outlet portion 40 of the feeder 5 to receive a stud 3 fed from the feeder, holding that stud 3 at its tip with the welding part 2 head first and welding the welding part 2 thereof to a workpiece 7. A stud queuing device 10 is provided at the outlet portion 40 of the feeder 5 for queuing the studs 3 fed one at a time from the outlet portion 40, with the welding parts 2 of the studs 3 head first. The welding gun 9 also has a stud path 11 for receiving the studs 3 fed from the feeder pipe 6 and sending them to its tip. The welding gun 9, furthermore, may be any stud welding gun, but in the embodiment shown, the gun is described as one for arc-welding studs, that is a gun that melts material being worked by generating an arc between the welding part 2 of a stud 3 held at the tip of the welding gun 9, on the one hand, and the weld position on the workpiece 7, on the other, and also one that is brought to abut the melted material by pressure so as to weld the studs 3 to the workpiece 7. It may be another welding gun such as, for example, a welding gun for performing resistance welding. Also, although not shown in the drawings, a controller is provided in the stud welding apparatus 1 for effecting control so that the welding operations indicated by stages I to IV in FIG. 1 are performed. First, the welding gun 9 is placed in an initial position in stage I in FIG. 1. Next, the welding gun 9 is moved to the welding operation position indicted at stage II in FIG. 1, and welding is performed. After this welding, the welding gun 9 is pulled up to a pulled-up position indicated at stage III in FIG. 1. And finally, the welding gun 9 finishes the welding at stage IV in FIG. 1.

As shown in FIG. 1, a shuttle mounting device 14 is provided between the outlet 42 of the stud queuing device 10 provided on the outlet side of the feeder 5 and the intake of the feeder pipe 6 for mounting a shuttle 13 to the rod-shaped shank of a stud 3, which shuttle is a hollow shuttle to receive the rod-shaped shank of the stud 3 so as to extend the length of the stud 3. The shuttle mounting device 14 receives a queued stud 3 in a first section 15, holds it in that state, then moves a shuttle 13 held in a prescribed orientation in a second section 17 toward that stud 3 and accommodates and holds the rod-shaped shank of that stud 3 in the hollow part of the shuttle 13. The overall length of the stud 3 to which the shuttle 13 has been mounted is thus extended to a prescribed length so the stud will not tumble in the feeder pipe 6 or in the stud path 11 of the welding gun 9. The manner in which the shuttle 13 is mounted to the stud 3 is not limited to that described above but may be some other method, and the structure may be any structure so long as the shuttle 13 can be mounted to a stud 3 queued and sent there in order to receive its rod-shaped shank.

Next, the stud 3, equipped with the shuttle 13, is sent through the feeder pipe 6 to the stud path 11 of the welding gun 9. This manner of feeding may be a conventionally known one and may be performed by pressure transport using pressurized air or the like, for example. The stud 3 equipped with a shuttle 13 sent to the stud path 11 of the welding gun 9 is sent, as is, to the tip of the welding gun 9 and is held at the tip of the welding gun 9 with the welding part 2 head first. As explained earlier, the overall length of the stud 3 to which the shuttle 13 is mounted is extended to a prescribed length so the stud will not tumble in the feeder pipe 6 or in the stud path 11 of the welding gun 9. By the shuttle 13, short studs 3 can be lengthened and even in cases where a single stud 3 is short enough to tumble in the feeder pipe 6 or in the stud path 11 of the welding gun 9, that stud 3 will then be sent through the feeder pipe 6 and through the stud path 11 of the welding gun 9 in a suitable posture, so the danger of jamming inside the feeder pipe 6 or stud path 11 can be eliminated.

In FIG. 1, the welding gun 9, which is holding a stud 3 equipped with a shuttle 13 at its initial position in stage I, is positioned at a prescribed welding position on the workpiece 7. As indicated by the arrow 18, the welding gun 9 is moved so as to approach the workpiece 7 and is moved to the welding operation position of stage II. During the welding operation, an arc is generated between the workpiece 7 and the welding part 2 of the stud 3; that portion is melted, and, as indicated by the arrow 19 in stage II, the welding part 2 of the stud 3 equipped with the shuttle 13 held at the tip of the welding gun 9 is then pressed against the workpiece 7, and the stud 3 is welded to the workpiece 7. After the stud 3 has been welded to the workpiece 7, the welding gun 9, oriented in the direction of the arrow 21 as indicated in stage III, is pulled up so as to move away from the welded stud 3. At that time, the welding gun 9 moves away from the workpiece 7 while still holding the shuttle 13 so that the latter separates from the welded stud 3. Consequently, the shuttle 13 will then be held by itself by the welding gun 9.

Then shuttle 13 held by the welding gun 9 is sent along a return path 22 of the welding gun 9 and through a return pipe 23 provided between [the welding gun 9 and] the shuttle mounting device 14 to a second section 17 of the shuttle mounting device 14. In this way, the shuttle 13 is returned in the same attitude as the shuttle(s) 13 accommodated in the second section 17 and the returned shuttle 13 can therefore be reused as is. Furthermore, because the shuttle mounting device 14 is provided between the stud queuing device 10 and the outlet of the feeder, as described earlier, when mounting a shuttle 13 to a stud 3, the stud 3 will already be in a queued condition, so mounting the shuttle 13 is easy, also facilitating handling used shuttles to be reused.

Figure 2:
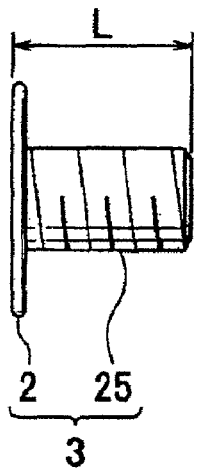
FIGS. 2A and 2B are a right side elevation and front elevation of a stud.
Figure 2:
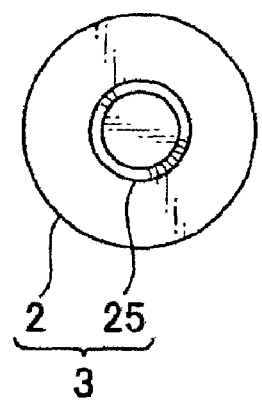
Figure 3:
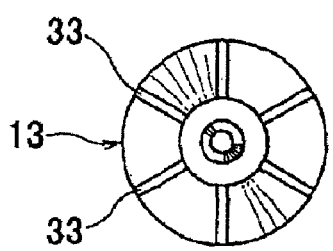
FIGS. 3A and 3B are a view of a shuttle as seen from the entrance part end and a vertical section thereof.
Figure 3:
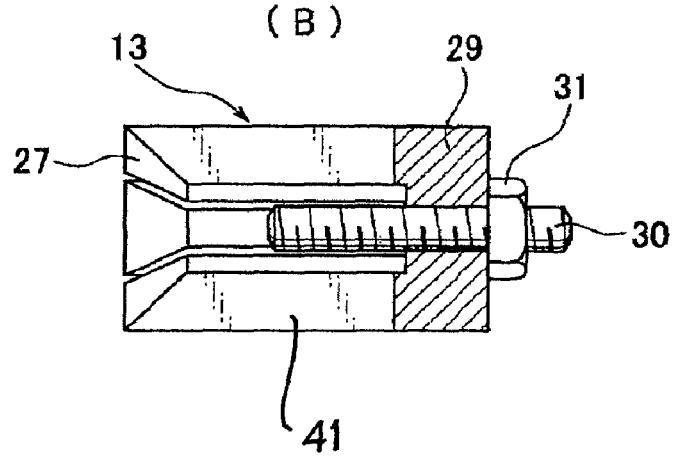

The stud 3 and shuttle 13 shall now be described with reference to FIGS. 2 to 4. The stud 3 is a commonly known item which, as shown in FIGS. 2A and 2B, comprises a large-diameter welding part 2 of diameter d and a rod-shaped shank 25 of length L that is smaller in diameter than the welding part 2. In the example shown, threads are formed in the rod-shaped shank 25, and a bolt stud is provided therein. Alternatively, the stud may be some other commonly known rod-shaped stud.

As shown in FIGS. 3A and 3B, the shuttle 13 comprises a hollow rod-shaped body 41 for receiving and holding the stud 3. In this embodiment, the welding gun 9 performs arc welding, so the shuttle 13 is formed of an electrically conducting material. In general, the shuttle will consist of an electrical conducting metal, but it may also be made of an electrical conducting plastic. The shuttle 13, moreover, is lengthened so the stud will not tumble in the feeder pipe 6 or in the stud path 11 of the welding gun. Accordingly, even if the stud 3 is so short as to be unsuitable for feeding to the tip of the welding gun 9, it can nevertheless be fed in a suitable posture to the tip of the welding gun 9. This shuttle 13 has an entrance part 27 flushly contacted by the large-diameter welding part 2 of a stud 3 received into its hollow part 26 and a terminating part 29 for receiving the other end of the received stud 3 and closing off the hollow part 26. A threaded member 30 is provided in the terminating part 29 and is of such length as to be able to abut the other end of the received stud 3 which can alter the extension length from the terminating part 29 to the hollow part 26 so as to match the length of the received stud 3. In this way, a stud 3 received into the hollow part 26 of the shuttle 13 can be held so that it does not wobble. A lock nut 31 is provided in the threaded member 30 on the outside of the terminating part 29, thus enabling fixing the lengthened threaded member 30 from the terminating part 29 to the hollow part 26. Moreover, a plurality of slits 33 (six in the example shown) is formed in the shuttle 13 in the circumferential direction, extending in the longitudinal direction from the entrance part 27 toward the terminating part 29. The inner diameter of the stud-receiving hollow part 26 of the stud 3, moreover, is formed so as to be equal to or slightly smaller than the outer diameter of the stud 3. The portion of the shuttle 13 from the entrance part 27 toward the terminating part 29 is formed by the slits 33 as a plurality of elastic pieces that extend in the longitudinal direction. The rod-shaped shank 25 of a stud 3 received into the hollow part 26 will then be held by these elastic pieces, so that insertion of the stud 3 is facilitated and, after insertion, frictional engagement is effected so that the received stud 3 does not wobble. The entrance part 27, moreover, is formed in a bugle shape to facilitate receiving the rod-shaped shanks 25 of the studs 3.

Figure 4:
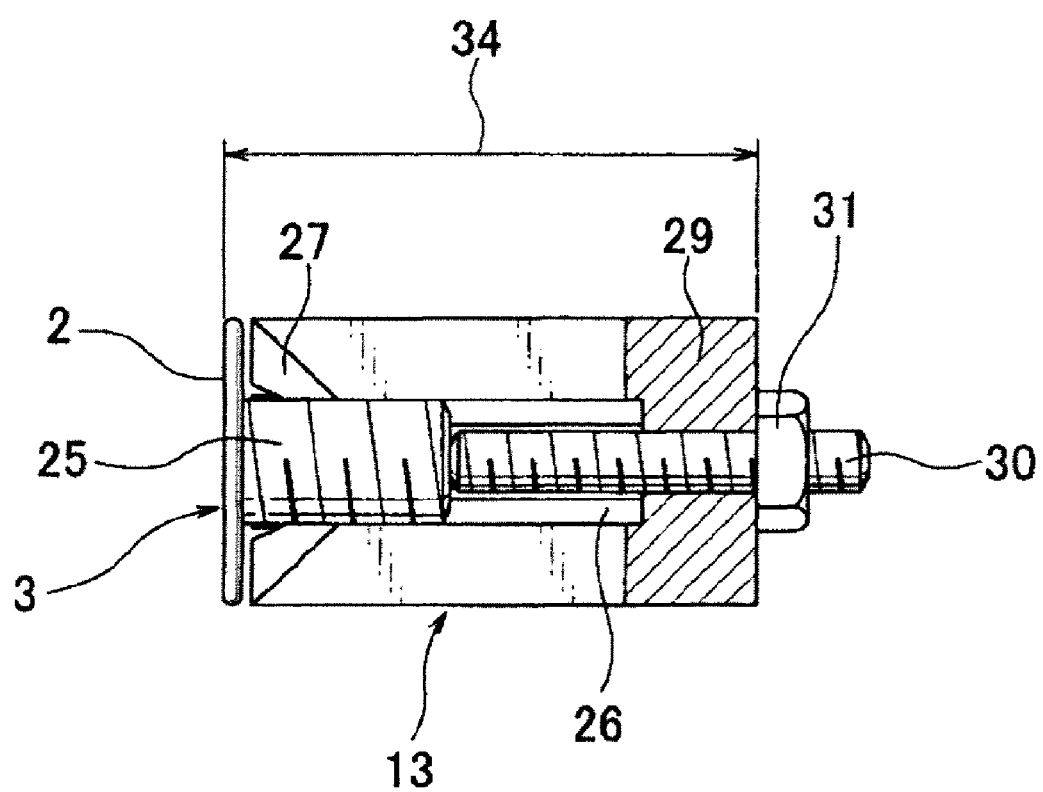
FIG. 4 is a vertical section of a shuttle wherein the shuttle shown in FIG. 3 has been mounted to the stud shown in FIG. 2.

FIG. 4 shows how a short stud 3 has a shuttle 13 mounted to it so that its overall length 34 is extended. The overall length 34 is set at a length so the stud will not tumble in the feeder pipe 6 or in the stud path 11 of the welding gun. When the stud 3 and the shuttle 13 have been combined, the overall length 34 is set at a length so the stud will not tumble in the feeder pipe 6 or in the stud path 11 of the welding gun, but as shown in FIG. 5, there are also cases where the diameter of the welding part 2 of the stud 3 will fit deeply into the end of the bugle-shaped shuttle entrance part 27 so the overall length of the shuttle 13 may be set at a length so the stud will not tumble in the feeder pipe 6 or in the stud path 11 of the welding gun.

Figure 5:
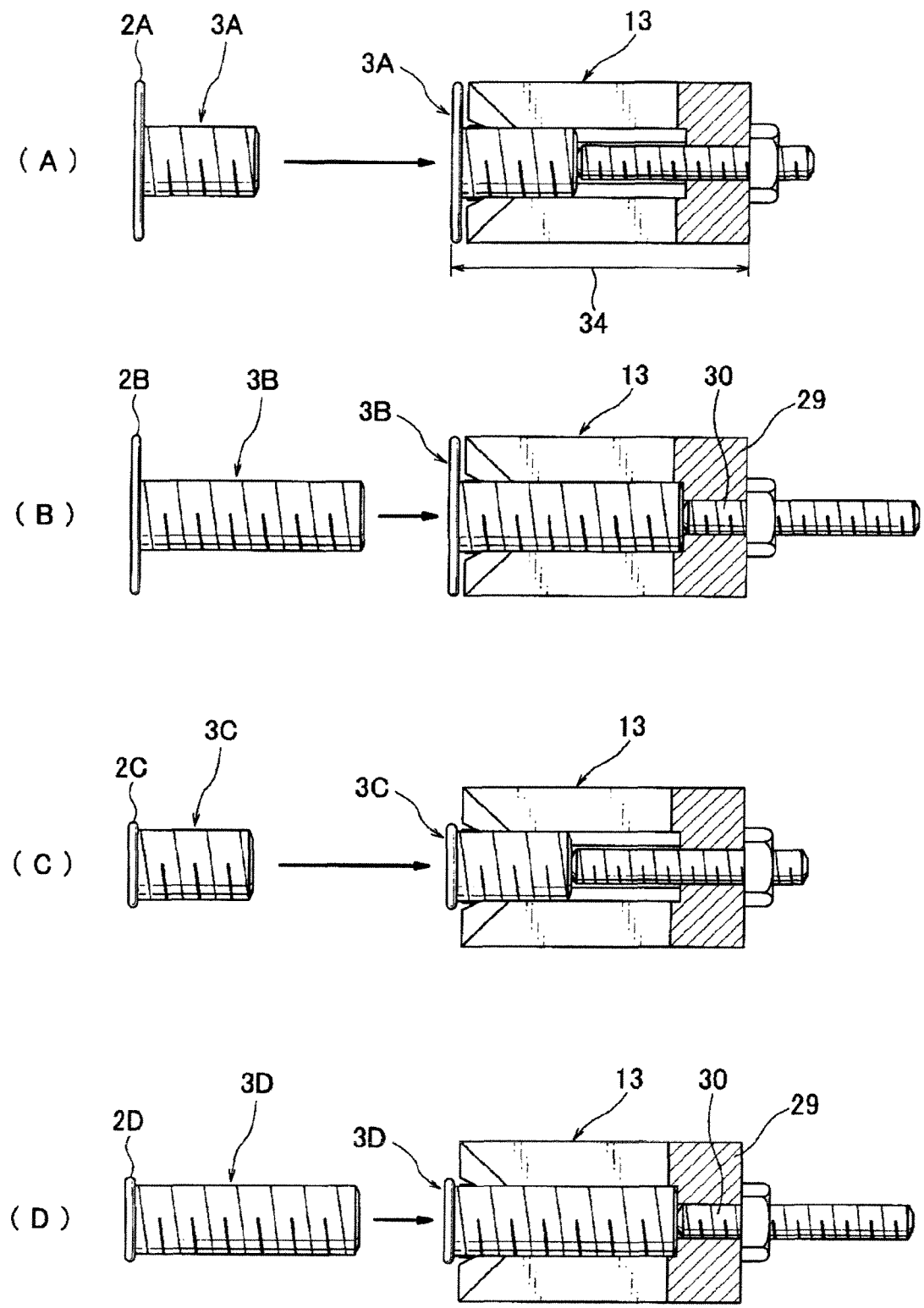
FIGS. 5A to 5D are vertical sections of shuttles wherein the shuttle shown in FIG. 3 has been mounted to various studs.

FIG. 5 shows examples wherein the shuttle 13 is mounted to various studs. FIG. 5A shows how the shuttle 13 is mounted to a short stud 3A having a welding part 2A of large diameter. FIG. 5B shows how the shuttle 13 is mounted to a slightly long stud 3B and having a welding part 2B of large diameter. Because the stud 3B is long, the threaded member 30 does not extend to the hollow part of the shuttle 13. FIG. 5C shows how the shuttle 13 is mounted to a short stud 3C and having a welding part 2C of small diameter. FIG. 5D shows how the shuttle 13 is mounted to a long stud 3D but having a welding part 2D of small diameter. As is evident from these diagrams, the overall length of a stud to which the shuttle 13 has been mounted is extended to a prescribed length 34 so the stud will not tumble in the feeder pipe 6 or in the stud path 11 of the welding gun 9, and, furthermore, every one of the shuttle 13-equipped studs, namely 3A to 3D, has a constant length 34. In the embodiment shown, moreover, the threaded member 30 extends away from the terminating part 29 of the shuttle 13, but this is no hindrance during feeding and also no hindrance in the feeding or holding in the welding gun 9.

What is claimed is:

1. A stud welding apparatus comprising:
a feeder for accommodating a plurality of rod-shaped studs having a rod-shaped shank, a large diameter welding part head at one end and a tip at an other end, and for feeding one stud at a time from an outlet portion thereof;
a shuttle mounting device provided at the outlet portion of the feeder;
a feeder pipe extending from the shuttle mounting device for receiving studs fed from said feeder;
a welding gun, which is connected to the feeder pipe, for holding a received stud at the tip with said welding part head first and for welding said welding part to a workpiece;
wherein the shuttle mounting device is provided for mounting a hollow shuttle to the rod-shaped shank of said stud, wherein the hollow shuttle receives the rod-shaped shank of said stud so as to extend the length of the stud so that the overall length, of the stud and hollow shuttle to which the stud has been mounted, is then made a prescribed length so the conjoined stud and hollow shuttle will not tumble in said feeder pipe or in a stud path in said welding gun.

2. The stud welding apparatus according to claim 1, wherein said welding gun welds a received stud to the workpiece while holding said shuttle and, after welding the received stud, the welding gun moves away from said workpiece while holding said shuttle so that the shuttle separates from the welded stud; said shuttle held by the welding gun is then returned to said feeder through a return pipe provided between said welding gun and said feeder.

3. The stud welding apparatus according to claim 1, wherein said shuttle comprises a hollow rod-shaped body for receiving and holding said stud and an extensible portion that can be lengthened so that the conjoined shuttle and mounted stud will not tumble in said feeder pipe or the stud path in said welding gun.

4. The stud welding apparatus according to claim 3, wherein the hollow rod-shaped body of said shuttle has an entrance part that serves to position the large-diameter welding part head of a mounted stud, a hollow part for receiving the other end of the mounted stud, a terminating part closing off the hollow part, and a threaded member threadably coupled to said terminating part and having such length as to abut at one end the other end of said mounted stud and extend from said terminating part at an other end by an amount that can then be changed in accordance with the length of the mounted stud.

5. The stud welding apparatus according to claim 4, wherein said shuttle has a plurality of radial slits extending in the longitudinal direction from said entrance part toward said terminating part; the inner diameter of the hollow part of the shuttle being equal to or slightly smaller than the outer diameter of said mounted stud.

6. The stud welding apparatus according to claim 1, wherein a stud queuing device is provided in said feeder, and said shuttle mounting device is provided at an outlet of the said stud queuing device.

7. The stud welding apparatus according to claim 2, wherein a stud queuing device is provided in said feeder, and said shuttle mounting device is provided at an outlet of the said stud queuing device.

8. The stud welding apparatus according to claim 3, wherein a stud queuing device is provided in said feeder, and said shuttle mounting device is provided at an outlet of the said stud queuing device.

9. The stud welding apparatus according to claim 4, wherein a stud queuing device is provided in said feeder, and said shuttle mounting device is provided at an outlet of the said stud queuing device.

10. The stud welding apparatus according to claim 5, wherein a stud queuing device is provided in said feeder, and said shuttle mounting device is provided at an outlet of the said stud queuing device.

* * * * *